United States Patent Office

3,726,836
Patented Apr. 10, 1973

3,726,836
VISCOSITY-STABILIZED SOLUTION OF
POLYURETHANE
Yasuji Nakahara and Jukichi Ohmura, Fuji, Japan, assignors to Asahi Kasei Kogyo Kabushiki Kaisha, Osaka Prefecture, Japan
No Drawing. Filed Mar. 25, 1971, Ser. No. 128,149
Claims priority, application Japan, Mar. 30, 1970, 45/25,912
Int. Cl. C08g 22/16, 51/46, 53/00
U.S. Cl. 260—75 NH                                 2 Claims

ABSTRACT OF THE DISCLOSURE

Method of manufacturing a stabilized solution of polyurethane from a prepolymer having terminal isocyanate groups. The stabilized solution is obtained by the use of a bifunctional chain extender in combination with a N,N-dialkylhydrazine and/or a N,N-diarylhydrazine and the subsequent aging under heating. The viscosity of the stabilized solution is reproducible, and does not undergo any change on heating and/or on the lapse of time. The polyurethane obtained according to this invention has also a light resistance and therefore, the molded article produced therefrom has a superior retention of strength. The solution is useful for making fibers, films, molded articles, etc.

---

This invention relates to the manufacture of a polyurethane, and more particularly to a method of manufacturing a stabilized solution of polyurethane.

For manufacturing a solution of polyurethane, there has heretofore been proposed a method comprising the steps of reacting a linear polymer having terminal hydroxyl groups with an organic diisocyanate to form a corresponding prepolymer having terminal isocyanate groups, and reacting the prepolymer with a bifunctional chain extender having therein two active hydrogen atoms in a solvent such as dimethylformamide, dimethylacetamide or dimethylsulfoxide. When the thus produced solution of polyurethane is extruded into a coagulating bath or a heated air, there can be obtained a desired product such as a film, a fiber or a molded elastomer article.

With such a conventional method, however, it has been frequently experienced by those skilled in the art to encounter various difficulties. Stated illustratively, the reaction between the prepolymer having terminal isocyanate groups and the chain extender tends to occur unevenly and locally; especially when an aliphatic diamine or hydrazine is employed as the chain extender, the reaction is so violent that it can not be sufficiently controlled. This leads to a local, extraordinary rise in viscosity or a local gelation of the polyurethane solution produced. Thus, it has been very difficult to always obtain a solution of polyurethane which has a constant viscosity. Furthermore, the conventionally obtained solution of polyurethane is subject to change in its viscosity on a little heating and/or according to the lapse of time. Such instability of the heretofore available solution of polyurethane has caused various difficulties in by practical use.

In order to overcome such drawbacks, some inprovements have ben suggested.

One improvement consists in, as described in Japanese patent publication No. 3,717/1965, using, as a chain terminator, a secondary aliphatic monoamine such as diethylamine, butylmethylamine or diisobutylamine in addition to a chain extender so that the prepolymer having terminal isocyanate groups is reacted with the chain terminator to control the viscosity of the resulting polymer at a given level, whereby the extraordinary rise in viscosity of the polymer solution is prevented.

Another improvement consists in, as described in Japanese patent publication No. 3,472/1966, reacting the prepolymer having terminal isocyanate groups with an equivalent or slightly less amount of an aliphatic diamine or hydrazine in an inert solvent and adding thereto a aliphatic monoamine and an organic acid or amine salt thereof.

However, these heretofore improved methods are insufficient to prevent unfavorable change in viscosity of the polyurethane solution on heating and/or on the lapse of time. Moreover, the distribution of viscosity of polyurethane solution obtained by each polymerization batch is uneven, so that it is very difficult to always obtain a polyurethane solution which has a constant viscosity. Such uneven distribution of viscosity of polyurethane solution is inevitable even when the reaction system is properly controlled in view of stoichiometry. The reason for this is not yet clear. But, it is considered to be possibly due to a little difference in reaction condition.

In U.S. patent application Ser. No. 11,073, now U.S. Pat. 3,666,708, it is suggested to produce a stabilized solution of polyurethane by reacting a prepolymer with a chain extender combined with a N,N-dialkylalkylene diamine and subsequently subjecting the resulting reaction mixture to aging under heating. But, although the thus obtained polyurethane solution has stability with respect to viscosity, it remains unresolved that the molded article obtained from the solution is poor in light resistance, leading to poor retention of strength.

Therefore, it is one object of the present invention to provide a method of manufacturing a stabilized solution of polyurethane which is completely free from change in viscosity even on heating and/or on the lapse of time.

Another object of the present invention is to provide a method described, whereby the molded article produced from the solution is improved to have a superior light resistance, leading to excellent retention of strength.

These and other objects, features and advantages of the present invention will be apparent from the following description.

According to the present invention, there is provided a method of manufacturing a solution of polyurethane which comprises reacting a prepolymer having terminal isocyanate groups with a bifunctional chain extender combined with an N,N-dialkylhydrazine having an alkyl moiety of 1 to 6 carbon atoms and/or a N,N-diarylhydrazine having an aryl moiety of 6 to 8 carbon atoms in a solvent, said N,N-dialkylhydrazine and/or N,N-diarylhydrazine being employed in an amount of 0.5 to 10 mole percent based on the amount of the bifunctional chain extender, and subjecting the resulting reaction mixture to aging under heating at a temperature of 70 to 150° C. for 5 hours or more.

In the method according to the present invention, the extraordinary rise in viscosity or gelation of the reaction mixture is not observed during the course of chain extension reaction, so that there is obtained a uniform solution of polyurethane. Further, after aging, the solution undergoes almost no change in viscosity even on reheating and/or on storage. Furthermore, it is to be noted that the polyurethane obtained by the present invention has unexpectedly an excellent stability against a light-deterioration.

The prepolymers having terminal isocyanate groups which are employed in this invention, are prepared by reacting a bifunctional linear polymer having terminal hydroxyl groups with an organic diisocyanate in the presence or absence of a solvent.

Examples of the bifunctional linear polymer having terminal hydroxyl groups include polyether diols such as polypropyleneether glycol and polytetramethyleneether glycol; polyester diols such as polyethylene adipate diol, polybutylene adipate diol, polypropylene adipate diol, poly ($\gamma$-butyrolactone) diol and poly ($\epsilon$-caprolactone) diol; polyetherurethane diols obtained by reacting the above-mentioned polyester diols with an orgaic diisocyanate; polyesterurethane diols obtained by reacting the above-mentioned polyester diols with an organic diisocyanate; and polyether ester diols such as poly ($\epsilon$-caprolactone-propylene glycol) and poly (dimethyl-$\epsilon$-caprolactone-ethylene glycol). Such bifunctional linear polymer having terminal hydroxyl group may be employed alone or in mixture. The molecular weight of the bifunctional linear polymer is suitably in the range of 800 to 3000.

Examples of the organic diisocyanates to be employed for preparing a prepolymer by reacting the above-mentioned bifunctional linear polymer therewith include aromatic diisocyanates such as 2,4-tolylene diisocyanate, 2,6 - tolylene diisocyanate, p-phenylene diisocyanate, 4,4'-diphenylmethane diisocyanate, 3,3' - dimethyl - 4,4' - diphenylmethane diisocyanate, 4,4' - diphenylene diisocyanate, 1,5 - naphthylene diisocyanate, p-xylene diisocyanate and m-xylylene diisocyanate; and aliphatic diisocyanates such as trimethylene diisocyanate, tetramethylene diisocyanate, methylene-bis - 4,4' - cyclohexyl isocyanate, and cyclohexane-1,4-diisocyanate. Such organic diisocyanates may be employed alone or in mixture.

For the synthesis of the prepolymer having terminal isocyanate groups to be employed in the present invention, the organic diisocyanate may be employed in an amount of 1 mole or more, preferably 1.2 to 2 moles per mole of the bifunctional linear polymer to be reacted therewith. The reaction of an organic diisocyanate with a linear polymer having terminal hydroxyl groups may be conducted in the absence of solvent or in the presence of a solvent which is substantially inert to the isocyanate group and capable of dissolving a formed polyurethane. Suitable examples of such solvents are organic polar solvents such as N,N-dimethylformamide, N,N-dimethylacetamide, N-methylpyrrolidone, tetramethylurea, hexamethylphosphoramide, tetramethylenesulfone and dimethylsulfoxide. The reaction for the synthesis of a prepolymer may be conducted at a temperature of 0 to 100° C. More particularly, in case no solvent is employed, the reaction may be effected at 70 to 100° C., more preferably 80 to 95° C., while, in case a organic polar solvent is employed, the reaction temperature is preferably in the range of 20 to 50° C.

The prepolymer having terminal isocyanate groups is, according to the present invention, dissolved in a solvent and then reacted with a bifunctional chain extender combined with a N,N-dialkylhydrazine and/or a N,N-diarylhydrazine. The reaction may be conducted at 0 to 50° C. but is, in practice, conducted at room temperature for convenience sake. As the solvent to be employed in this reaction, the same organic polar solvents as mentioned above with regard to the synthesis of prepolymer may be used. The N,N-dialkylhydrazine and/or N,N-diarylhydrazine is employed in an amount of 0.5 to 10 mole percent, preferably 1 to 7 mole percent based on the amount of the bifunctional chain extender. More the amount of N,N-dialkylhydrazine or N,N-diarylhydrazine, lower the viscosity of the obtained solution of polyurethane becomes while more the light resistance increases. Accordingly, the amount of N,N-dialkylhydrazine or N,N-diarylhydrazine is suitable determined according to the use of the product. Furthermore, it is generally preferred that the bifunctional chain extender and N,N-dialkylhydrazine and/or N,N-diarylhydrazine to be reacted with the prepolymer are employed, in relation to the amount of the prepolymer, in a proportion of such a range as defined by the formula $$0.93 \leq \frac{(A)}{(CNO)} \leq 1.20$$

more preferably $$0.97 \leq \frac{(A)}{(CNO)} \leq 1.10$$

wherein (A) is the sum of the numbers of the reactive functional groups of bifunctional chain extender and N,N-dialkylhydrazine and/or N,N - diarylhydrazine and (CNO) is the number of the isocyanate groups of prepolymer. In practising the reaction, it is desirable to add a solution of the prepolymer to a solution of the bifunctional chain extender and N,N-dialkylhydrazine and/or N,N-diarylhydrazine in a solvent such as dimethylformamide while stirring.

As the bifunctional chain extender, there may be employed chain extenders which are generally used for the preparation of a polyurethane. Examples include organic diamines such as ethylenediamine, 1,2-propylenediamine, tetramethylenediamine, hexamethylenediamine, p-xylylenediamine, m-xylylenediamine, cyclohexane - bis - methylamine, 1,4 - diaminopiperazine, 1,4 - cyclohexylenediamine and methylene-bis-cyclohexylamine; glycols such as ethylene glycol, propylene glycol, tetramethylene glycol, hexamethylene glycol and xylylene glycol; hydrazine and its derivatives such as carbohydrazide, diaminobiuret and adipic hydrazide; dibasic acids such as adipic acid, succinic acid and terephthalic acid; and water.

The N,N-dialkylhydrazines to be employed in this invention are suitably those having an alkyl moiety of 1 to 6 carbon atoms, and suitable examples include N,N-dimethylhydrazine, N,N-diethylhydrazine, N,N-dipropylhydrazine, N,N-diisobutylhydrazine, N,N-di-n-butylhydrazine, N,N-dicyclohexylhydrazine and N,N-di-hexylhydrazine. The N,N-diarylhydrazines to be employed in this invention are suitably those having an aryl moiety of 6 to 8 carbon atoms, and illustrative examples include N,N-diphenylhydrazine, N,N-ditolylhydrazine and N,N-dibenzylhydrazine. They may be used alone or in mixture.

As described, according to the present invention, the reaction between a prepolymer having terminal isocyanate groups, a bifunctional chain extender and an N,N-dialkylhydrazine and/or N,N-diarylhydrazine gives a high viscosity solution of polyurethane. In this instance, with the use of a bifunctional chain extender in combination with an N,N-dialkylhydrazine and/or diarylhydrazine, the extraordinary rise in viscosity or gelation of the resulting reaction mixture can be completely obviated. In this connection, however, it is noted that the reaction mixture is inevitably accompanied by a variety of viscosities by each batch polymerization reaction, even though the quantitative proportion of the reactants as well as the reaction conditions are properly and strictly controlled.

However, it is to be noted that when the high viscosity reaction mixture or solution obtained directly by the polymerization is heated to 70° C. or more against a prior common knowledge that the heat treatment of the solution of polyurethane should be avoided, the viscosity of the solution rapidly drops to a certain level, which is maintained substantially constant even by further heating operation and/or storage for a considerable period of time. Stated differently, once the viscosity of the present high viscosity solution is lowered by heating at 70° C. or more to a certain level, the viscosity no longer drops by further heating.

The thus obtained solution of polyurethane is extremely stable on heating and/or on the lapse of time. Upon storage under various conditions, any change in viscosity is not observed. Furthermore, it is surprisingly to be noted that the viscosities of the solutions thus aged under heating are uniform and are all stabilized to have a certain level even though the viscosity of the solution before aging varies by each batch polymerization. The reason for this is not yet known. However, it can be said that such unexpected effect of the aging under heating can be attained only by the use of the bifunctional chain extender in combination with the N,N-dialkylhydrazine and/or N,N-diarylhydrazine. With the conventionally employed molecular weight controlling agent, for example dimethylamine, diethylamine, monoethylamine, the above-mentioned stabilization effect is not observed. The aging operation according to the present invention is conducted at a temperature of 70 to 150° C., more preferably 80 to 130° C. The period of aging time is necessarily 5 hours or more. Even if the aging is effected for a long period, for example more than 20 hours, the once stabilized solution does not undergo any change in viscosity. So, there is no critical upper limit for the aging period. Yet, from the industrial point of view, the aging time of 8 to 20 hours is suitably employed.

It is further to be noted that the molded article, for example fiber which is produced from the solution thus stabilized, has a superior light resistance or an excellent retention of strength, that is of importance for fiber. Such improvement has first been attained by the present invention.

As described, the stabilized solution of polyurethane obtained according to the present invention does not undergo any change on heating and/or on the lapse of time. Thus, the stabilized solution of polyurethane is useful for making fibers, films, molded elastomer article, etc. Furthermore, it is noted that various pigments such as titanium dioxide, various additional stabilizers, dyestuffs and the like can be incorporated in the present stabilized solution of polyurethane without difficulty.

The present invention is illustrated, by way of example only, with reference to the following examples.

EXAMPLE 1

15 kg. of polyethylene adipate diol sufficiently dried and having an average molecular weight of 1,200 and 4.5 kg. of methylene-bis(4-phenyl isocyanate) were admixed, while stirring, under a nitrogen stream at 50° C. and heated at such temperature for 1 hour, and then further heated at 90° C. for 80 minutes. The resulting prepolymer having terminal isocyanate groups was cooled to 60° C. and then 28 kg. of dimethylacetamide were added, whereupon agitation was effected at 25° C. for 200 minutes so as to completely dissolve the prepolymer in the dimethylacetamide, thereby to obtain a solution of prepolymer. The thus obtained solution of prepolymer was added, with violent, high speed stirring, to a mixture solution of 15 kg. of dimethylacetamide, 323 g. of N,N-diethylhydrazine, 300 g. of ethylenediamine and 5 g. of water, and then allowed to react at room temperature for 4 hours. Thus, 30% by weight polyurethane solution was obtained.

The procedure described above was repeated three times. The thus obtained three kinds of polyurethane solutions and three different viscosities of 4,700, 5,600 and 6,400 poises at 30° C., respectively. A part of each of the obtained solutions was stored at room temperature and the viscosities thereof were measured. The change of viscosity according to the lapse of time was shown in Table 1.

TABLE 1
[Poises at 30° C.]

| Solution number | Time (days) | | | |
|---|---|---|---|---|
| | 0 | 1 | 2 | 10 |
| 1 | 4,700 | 6,500 | 10,000 | Gel.[1] |
| 2 | 5,600 | 7,900 | 12,000 | Gel.[1] |
| 3 | 6,400 | 8,500 | 15,000 | Gel.[1] |

[1] The "gel" means that the solution can not be spun.

On the other hand, the above-mentioned three kinds of solutions were, without storage, subjected directly to aging under heating at 85° C. for 20 hours. During aging, the viscosities of the solutions were stepwise measured. The results are summarized in Table 2.

TABLE 2
[Poises at 30° C.]

| Solution number | Aging time (hours) | | | | | | |
|---|---|---|---|---|---|---|---|
| | 0 | 3 | 4 | 5 | 10 | 15 | 20 |
| 1 | 4,700 | 3,500 | 3,000 | 2,750 | 2,620 | 2,600 | 2,600 |
| 2 | 5,600 | 3,800 | 3,200 | 2,780 | 2,650 | 2,630 | 2,620 |
| 3 | 6,400 | 4,100 | 3,400 | 2,790 | 2,640 | 2,630 | 2,630 |

As is apparent from Table 2, after aging, the resulting solutions had substantially the same viscosities i.e. 2,600, 2,620 and 2,630 poises, respectively. They had an excellent spinnability, and were colorless and transparent. When the solutions of polyurethane were further heated at 70° C. for 10 hours, they did not undergo almost any change in viscosity. Meanwhile, some of each of the solutions of polyurethane was allowed to stand at room temperature for 1 month, it did not undergo almost any change in viscosity.

Such solution of polyurethane was subjected to a wet spinning in a water bath to obtain a yarn of 290 denier. The yarn thus obtained was examined on its light resistance under exposure to light for 15 hours by means of a fade meter. It was found that the retention of strength of the present yarn was 66%.

COMPARATIVE EXAMPLE 1

The polyurethane solution was obtained in the same manner as described in Example 1 except that 26.9 g. of dimethylamine were used in place of 323 g. of N,N-diethylhydrazine. And the procedure described above was repeated three times. The thus obtained three kinds of polyurethane solutions had three different viscosities of 5,100, 6,700 and 4,600 poises, respectively.

After aging at 85° C. for 20 hours the viscosities of the solutions changed to 4,800, 8,500 and 3,200 poises, respectively.

The thus obtained solutions were stored and, the viscosities of the solutions were measured and shown in Table 3.

TABLE 3
[Poises at 30° C.]

| Solution Number | Time (day) | | | | |
|---|---|---|---|---|---|
| | Before aging | Immediately after completion of the aging | 1 | 2 | 10 |
| 1 | 5,100 | 4,800 | 7,000 | 9,800 | Gel. |
| 2 | 6,700 | 8,500 | 12,000 | (1) | Gel. |
| 3 | 4,600 | 3,200 | 4,500 | 8,000 | Gel. |

[1] Impossible to measure.

Each of the solutions before aging was subjected to a wet spinning in water bath to obtain a yarn of 290 denier. The thus obtained yarn was examined on its light resistance in the same manner as described in Example 1. It was found that the retention of the strength of the yarn was 35%.

COMPARATIVE EXAMPLE 2

The polyurethane solution was obtained in the same manner as in Example 1 except that 42.6 g. of N,N-diethyl ethylene diamine were used in place of 323 g. of N,N-diethylhydrazine. The thus obtained polyurethane solution had a viscosity of 5,200 poises at 30° C.

After aging at 85° C. for 20 hours the viscosity of the solution became 2,900 poises at 30° C.

The resulting solution was subjected to a wet spinning in water bath to obtain a yarn of 290 denier. The thus obtained yarn was examined on its light resistance in the same manner as described in Example 1.

It was found that the retention of the strength of the yarn was 37%.

EXAMPLE 2

The solution of prepolymer obtained in the same manner as described in Example 1 was added, with violent, high speed stirring, to a mixture of a solution of 14 kg. of dimethylacetamide, 341 g. of N,N-dimethylhydrazine, and 160 g. of anhydrous hydrazine and then allowed to react at room temperature for 3 hours to obtain a solution having a viscosity of 5,000 poises at 30° C. The solution was subjected to aging under heating at 85° C. for 15 hours. The resulting solution of polyurethane had a viscosity of 2,800 poises at 30° C. and an excellent spinnability, and was colorless and transparent. When the solution of polyurethane was further heated at 70° C. for 15 hours, it did not undergo any change in viscosity. Meanwhile, when the solution of polyurethane was allowed to stand at room temperature for 25 days, it did not undergo any change in viscosity.

Such solution of polyurethane was spun in the same manner as described in Example 1 to obtain a yarn of 285 denir. The yarn thus obtained was examined on its light resistance under exposure to light for 15 hours by means of a fade meter. As a result, it was found that the retention of strength of the present yarn was 68%.

EXAMPLE 3

14 kg. of polytetramethyleneether glycol having a molecular weight of 1,200 and 4 kg. of methylene-bis-(4-phenyl isocyanate) were reacted, while stirring, under a nitrogen stream at 90° C. for 90 minutes. The resulting prepolymer having terminal isocyanate groups was dissolved in 28 kg. of dimethylacetamide, with sufficient agitation. The thus obtained solution of prepolymer was added, with violent, high speed stirring, to a mixture of a solution of 15 kg. of dimethylacetamide, 380 g. of 1,3-propylenediamine and 607 g. of N,N-diethylhydrazine, and then allowed to react at room temperature for 3 hours to obtain a solution having a viscosity of 5,300 poises at 30° C. The solution was subjected to aging under heating at 80° C. for 20 hours. The resulting solution of polyurethane was extremely uniform and had a viscosity of 2,900 poises at 30° C. When the solution of polyurethane was further heated at 80° C. for 8 hours, it did not undergo almost any change in viscosity at room temperature before and after heating. Meanwhile, when the solution of polyurethane was allowed to stand at room temperature for 1 month, it did not undergo almost any change in viscosity.

The viscous solution thus obtained was spun in the same manner as described in Example 1. The yarn produced was examined with respect to light resistance, in the same manner as described in Example 1. As a result, it was found that the retention of strength of the present yarn was 60%.

COMPARATIVE EXAMPLE 3

The same procedure as described in Example 3 was repeated except that the aging operation was conducted at 60° C. for 20 hours. During aging, the viscosity of the solution was measured and shown in Table 4.

TABLE 4
[Poises at 30° C.]

| | Aging time (hours) | | | | | | |
|---|---|---|---|---|---|---|---|
| | 0 | 3 | 5 | 10 | 15 | 20 | 72 |
| Viscosity (poises) | 5,900 | 6,400 | 6,300 | 6,050 | 5,500 | 5,100 | 4,100 |

It was found that the changes of viscosity of the solution were irregular and even after 3 days a stabilized solution could not be obtained.

COMPARATIVE EXAMPLE 4

The same procedure as described in Example 3 was repeated except that the aging temperature was 180° C.

The polyurethane solution boiled at such a high temperature, so any effect was not observed for stabilizing the polyurethane solution.

EXAMPLE 4

10 kg. of poly($\epsilon$-caprolactone) diol having a molecular weight of 1,000 and 3.76 kg. of xylylene diisocyanate were reacted, while stirring under a nitrogen stream at 95° C. for 3 hours. The resulting prepolymer was dissolved in 30 kg. of dimethylformamide with sufficient stirring. The thus obtained solution of prepolymer was added to a solution of 836 g. of tetramethylene diamine and 72 g. of N,N-diisobutyl-hydrazine in 12 kg. of dimethylformamide, with violent agitation, to react at room temperature. The solution of polyurethane obtained by the 3-hour reaction had a viscosity of 4,800 poises at 30° C. The solution of polyurethane obtained by a subsequent aging under heating at 80° C. for 18 hours was extremely uniform and had a viscosity of 2,700 poises measured at 30° C. The solution obtained by a further aging under heating at 80° C. for 5 hours had a viscosity of 2,680 poises at 30° C. and did not undergo any change in viscosity. The viscous solution thus obtained was spun in the same manner as described in Example 1. The yarn produced was examined as to its light resistance, in the same manner as described in Example 1. As a result, it was found that the retention of strength of the present yarn was 75%.

EXAMPLE 5

11.25 kg. of polyester urethane having a molecular weight of 2,250 obtained from polybutylene adipate having a molecular weight of 1,000 and methylene-bis-(4-phenyl isocyanate) was reacted with 1.4 kg. of tetramethylenediamine, while stirring, under a nitrogen stream at 70° C. for 6 hours. The resulting prepolymer was dissolved in 30 kg. of dimethylformamide with sufficient stirring. The thus obtained solution of prepolymer was added to a solution of 659.6 g. of p-xylylenediamine and 29.4 g. of N,N-dicyclohexylhydrazine in 12 kg. of dimethylformamide, with violent agitation, to react at room temperature. The solution of polyurethane having viscosity of 5,300 poises at 30° C. was obtained. The solution of polyurethane obtained by a subsequent aging under heating at 80° C. for 18 hours was extremely uniform and had a viscosity of 2,600 poises at 30° C. The solution obtained by a further aging under heating at 80° C. for 5 hours had a viscosity of 2,570 poises at 30° C. and did not undergo any change in viscosity. The viscous solution thus obtained was spun in the same manner as described in Example 1. The yarn produced was examined with respect to light resistance, in the same manner as described in Example 1. As a result, it was found that the retention of strength of the present yarn was 69%.

EXAMPLE 6

10 kg. of polyether ester having molecular weight of 1,000 obtained by copolymerization of propylene oxide and $\epsilon$-caprolactone at a proportional ratio of 30:70 with a polymerization starting agent of ethylene glycol and 3.2 kg. of p-phenylene diisocyanate were reacted, while stirring, under a nitrogen stream at 80° C. for 3 hours. The resulting prepolymer was dissolved in 30 kg. of dimethylformamide with sufficient stirring. The thus obtained solution of prepolymer was added to a solution of 1.1 kg. of 1,4-diaminopiperazine and 92 g. of N,N-diphenyl-hydrazine in 12 kg. of dimethylformamide, with violent agitation, to react at room temperature. The solution of polyurethane obtained by the 3-hour reaction had a viscosity of 4,500 poises at 30° C. The solution of polyurethane obtained by a subsequent aging under heating at 80° C. for 18 hours was extremely uniform and had a viscosity of 2,300 poises at 30° C. The solution obtained by a further aging under heating at 130° C. for 5 hours had a viscosity of 2,250 poises at 30° C. and did not undergo any change in viscosity. The viscous solution thus obtained was spun in the same manner as described in Example 1. The yarn produced was examined with respect to light resistance, in the same manner as described in Example 1. As a result, it was found that the retention of strength of the present yarn was 56%.

EXAMPLE 7

10 kg. of polypropyleneether glycol having a molecular weight of 1,000 and 5.2 kg. of methylene-bis-4,4'-cyclohexyl isocyanate were reacted, while stirring, under a nitrogen stream at 95° C. for 3 hours. The resulting prepolymer was dissolved in 30 kg. of dimethylformamide with sufficient stirring. The thus obtained solution of prepolymer was added to a solution of 1.3 kg. of xylylene glycol and 107 g. of N,N-ditolylhydrazine in 12 kg. of dimethylformamide, with violent agitation, to react at room temperature. The solution of polyurethane obtained by the 3-hour reaction had a viscosity of 4,900 poises at 30° C. The solution of polyurethane obtained by a subsequent aging under heating at 80° C. for 18 hours was extremely uniform and had a viscosity of 2,400 poises at 30° C. The solution obtained by a further aging under heating at 70° C. for 20 hours had a viscosity of 2,400 poises at 30° C. and did not undergo any change in viscosity. The viscous solution thus obtained was spun in the same manner as described in Example 1. The yarn produced was examined with respect to light resistance, in the same manner as described in Example 1. As a result, it was found that the retention of strength of the present yarn was 85%.

EXAMPLE 8

10 kg. of poly (ε-caprolactone) diol having a molecular weight of 1,000 and 5 kg. of methylene-bis(4-phenyl isocyanate) were reacted, while stirring, under a nitrogen stream at 95° C. for 1 hour. The resulting prepolymer was dissolved in 30 kg. of dimethylformamide with sufficient stirring. The thus obtained solution of prepolymer was added to a solution of 540 g. of ethylenediamine, 9 g. of water and 107 g. of N,N-dibenzylhydrazine in 12 kg. of dimethylformamide, with violent agitation, to react at room temperature. The solution of polyurethane obtained by the 3-hour reaction had a viscostiy of 5,200 poises at 30° C. The solution of polyurethane obtained by a subsequent aging under heating at 80° C. for 18 hours was extremely uniform and had a viscosity of 2,900 poises at 30° C. The solution obtained by a further aging under heating at 80° C. for 5 hours had a viscosity of 2,860 poises at 30° C. and did not undergo any change in viscosity. The viscous solution thus obtained was spun in the same manner as described in Example 1. The yarn produced was examined with respect to light resistance, in the same manner as described in Example 1. As a result, it was found that the retention of strength of the present yarn was 59%.

EXAMPLE 9

The same procedure as described in Example 1 was repeated except that a mixture of 16.2 g. of N,N-diethylhydrazine and 32.0 g. of N,N-diphenylhydrazine was employed in place of 323 g. of N,N-diethylhydrazine. The viscosity of the resulting solution before aging was 5,200 poises at 30° C. Then, the aging operation was conducted at 85° C. for 20 hours to give a stabilized solution. The polyurethane solution thus aged had a viscosity of 2,580 poises at 30° C. and did not undergo any change in viscosity. The viscous solution thus obtained was spun in the same manner as described in Example 1. The yarn produced was examined with respect to light resistance, in the same manner as described in Example 1. It was found that the retention of strength of the present yarn was 69%.

What is claimed is:

1. A polyurethane solution obtained by reacting a prepolymer having terminal isocyanate groups with a bifunctional chain extender combined with an N,N-dialkylhydrazine having an alkyl moiety of 1 to 6 carbon atoms and/or a N,N-diarylhydrazine having an aryl moiety of 6 to 8 carbon atoms in a solvent, said N,N-dialkylhydrazine and/or N,N-diarylhydrazine being employed in an amount of 0.5 to 10 mole percent based on the amount of the bifunctional chain extender, and subjecting the resulting reaction mixture to ageing under heating at a temperature of 70 to 150° C. for at least 5 hours.

2. A polyurethane solution, according to claim 1, wherein said N,N-dialkylhydrazine is selected from the group consisting of N,N-dimethylhydrazine, N,N-diethylhydrazine, N,N-dipropylhydrazine, N,N-diisobutylhydrazine, N,N-di-n-butylhydrazine, N,N-dicyclohexylhydrazine and N,N-dihexylhydrazine, and wherein said N,N-diarylhydrazine is selected from the group consisting of N,N-diphenylhydrazine, N,N-ditolylhydrazine and N,N-dibenzylhydrazine.

References Cited

UNITED STATES PATENTS 3,642,703   2/1972   Suzuki et al.

DONALD E. CZAJA, Primary Examiner

H. S. COCKERAM, Assistant Examiner

U.S. Cl. X.R.

260—30.4 N, 30.6 R, 30.8 R, 30.8 DS, 32.6 N, 77.5 AM, 77.5 SP, 77.5 SS